United States Patent
Yang et al.

(10) Patent No.: US 9,613,544 B2
(45) Date of Patent: Apr. 4, 2017

(54) ELECTROACTIVE, ACTUATED DOT STRUCTURES AND ASSOCIATED METHODS

(71) Applicant: North Carolina State University, Raleigh, NC (US)

(72) Inventors: Peichun Yang, Raleigh, NC (US); David A. Winick, Raleigh, NC (US); Paul Franzon, New Hill, NC (US); Neil H. DiSpigna, Durham, NC (US)

(73) Assignee: North Carolina State University, Raleigh, NC (US)

( * ) Notice: Subject to any disclaimer, the term of this patent is extended or adjusted under 35 U.S.C. 154(b) by 246 days.

(21) Appl. No.: 14/446,456

(22) Filed: Jul. 30, 2014

(65) Prior Publication Data

US 2015/0037763 A1 Feb. 5, 2015

Related U.S. Application Data

(60) Provisional application No. 61/860,852, filed on Jul. 31, 2013.

(51) Int. Cl.
*G09B 21/00* (2006.01)

(52) U.S. Cl.
CPC .................................. *G09B 21/004* (2013.01)

(58) Field of Classification Search
CPC ..... G09B 21/003–21/004; G09B 21/02; G09B 21/025; G09B 21/04; G06F 3/016
See application file for complete search history.

(56) References Cited

U.S. PATENT DOCUMENTS 4,812,698 A * 3/1989 Chida .................. H01L 41/094
310/328
2009/0023116 A1 * 1/2009 Shaw .................. G09B 21/004
434/114

* cited by examiner

*Primary Examiner* — Timothy A Musselman
(74) *Attorney, Agent, or Firm* — Olive Law Group, PLLC

(57) ABSTRACT

Systems and methods for an electroactive polymer actuated dot structure is disclosed herein. According to an aspect, an actuated dot structure includes a housing. The actuated dot structure also includes a pin configured to move between a first position and a second position with respect to the housing. Further, the actuated dot structure includes a multimorph engaged with the pin and configured to displace the pin between the first and second positions and to latch the pin in the second position.

32 Claims, 12 Drawing Sheets

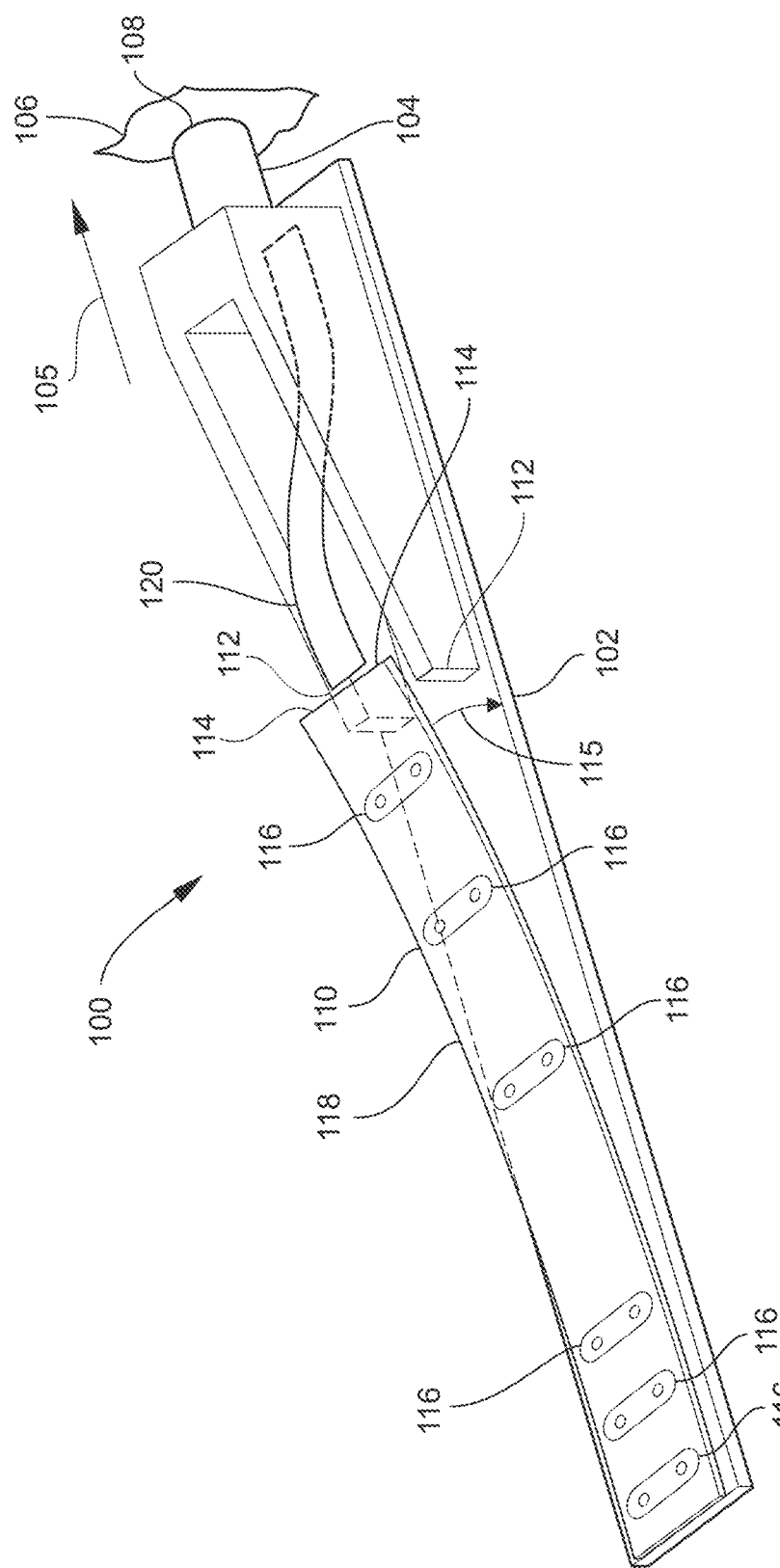

ELECTROACTIVE, ACTUATED DOT STRUCTURES AND ASSOCIATED METHODS

CROSS REFERENCE TO RELATED APPLICATION

This application claims the benefit of and priority to U.S. Provisional Patent Application No. 61/860,852, filed Jul. 31, 2013 and titled ELECTROACTIVE POLYMER BRAILLE CELL STRUCTURES AND MODULATION STRUCTURES, the disclosure of which is incorporated herein by reference in its entirety.

FEDERALLY SPONSORED RESEARCH OR DEVELOPMENT

This invention was made with government support under grant number H133G070135 awarded by the National Institute on Disability and Rehabilitation Research (NIDRR) within the United State Department of Education, and under grant number IIP-1215120 awarded by the National Science Foundation (NSF). The government has certain rights to this invention.

TECHNICAL FIELD

The present disclosure relates to refreshable Braille displays. More particularly, the present disclosure relates to electroactive, actuated dot structures and associated methods.

BACKGROUND

A refreshable Braille display is an electromechanical device including multiple tactile cells. The Braille display can be connected to a computer by way of a wired or wireless connection. Typical Braille displays include 20, 40, or even 80 cells. Each cell, in turn, contains six or eight tactile pins that move up and down in response to electrical voltage. The tactile pins can be driven by mechanical, electromechanical, piezoelectric, pneumatic, or magnetic effects. When in the raised position, the pins extend above a tactile surface and can be felt by a user. By raising certain pins and keeping others below the tactile surface, individual Braille characters can be represented. The series of cells together represent a line of text. After a line has been read, the user can refresh the display to allow for additional lines to be presented and read. Braille displays are often combined with other hardware and software to make up an integrated unit. For instance, Braille displays can be connected in place of video monitors to serve as the display unit, and many units incorporate speech output of the screen prompts. In this regard, computer software can be employed to convert a visual image in a screen buffer of the computer into text to be displayed on the Braille display.

Electromechanical tactile cells for use in refreshable Braille displays and graphical tactile displays have been developed. One example of a tactile cell includes eight piezoelectric reed elements corresponding to eight tactile pins. The necessary electrical connections and driving forces are provided to actuate the reeds, thereby causing the tactile pins to protrude above a tactile surface to allow the Braille character or graphic element to be displayed. However, such electromechanical tactile cell structures require significant tolerances and power requirements. Additionally, alternative electromechanical tactile cell structures may experience longevity issues due to the use of fluid displacement amplifiers and rubber seals. Braille-pin and -cell lateral spacing is sufficiently small, and vertical displacement, speed, and blocking force sufficiently large, that implementing refreshable Braille under NLS-specified tolerances has been a difficult fit for many technologies.

In view of the foregoing, there is a need for improved Braille displays.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Electroactive, actuated dot structures and associated methods are disclosed. According to an aspect, an actuated dot structure includes a housing. The actuated dot structure also includes a pin configured to move between a first position and a second position with respect to the housing. Further, the actuated dot structure includes a multimorph engaged with the pin and configured to displace the pin between the first and second positions and to latch the pin in the second position.

According to another aspect, an actuated dot structure includes a housing. The actuated dot structure includes a pin defining a latch opening and including a first end and a second end. Further, the actuated dot structure includes a pin defining a latch opening, including a first end and a second end, and configured to move between a first position and a second position with respect to the housing. The actuated dot structure also includes a multimorph including a supporting portion configured to controllably engage and disengage the latch opening. Further, the actuated dot structure includes a biasing element configured to engage the second end of the pin for biasing the pin to move towards the second position According to another aspect, a method of actuating an actuated dot structure includes providing the actuated dot structure. The actuated dot structure includes a housing. The actuated dot structure includes a pin including a top end, and configured to move between a first position and a second position with respect to the housing. Further, the actuated dot structure includes a multimorph engaged with the pin, configured to displace the pin between the first and second positions, and configured to latch the pin in the second position. Further, the method includes biasing the pin to move towards the second position. The method also includes actuating a multimorph to latch the pin in the second position.

BRIEF DESCRIPTION OF THE DRAWINGS

The foregoing summary, as well as the following detailed description of various embodiments, is better understood when read in conjunction with the appended drawings. For the purposes of illustration, there is shown in the drawings exemplary embodiments; however, the presently disclosed subject matter is not limited to the specific methods and instrumentalities disclosed. In the drawings:

FIG. 1A illustrates a perspective view of an actuated dot structure in an unlatched position in accordance with embodiments of the present disclosure;

DETAILED DESCRIPTION

Figure 1B:
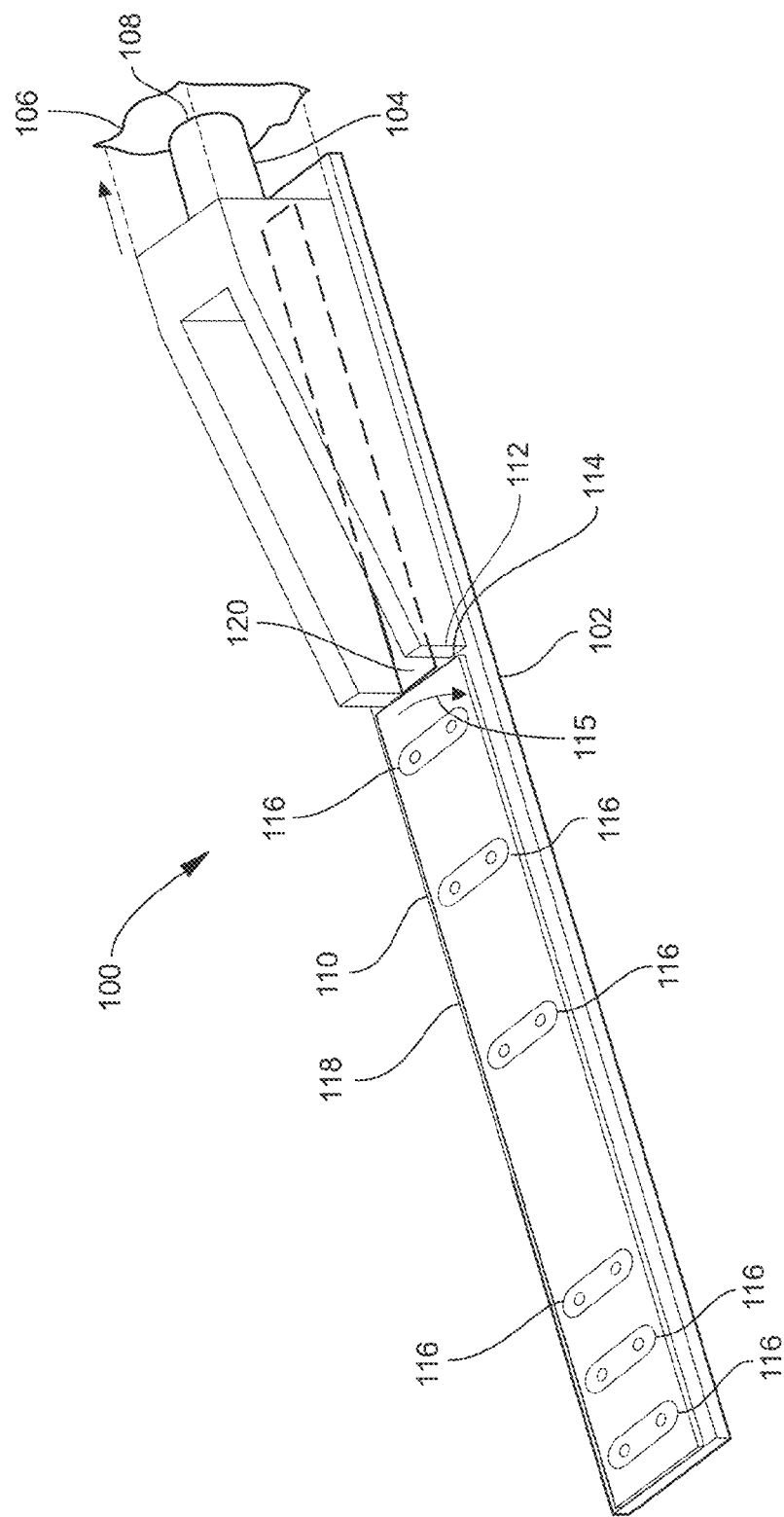
FIG. 1B illustrates a perspective view of the actuated dot structure in a latched position with the pin end engaging the diaphragm in accordance with embodiments of the present disclosure.

The presently disclosed subject matter is described with specificity to meet statutory requirements. However, the description itself is not intended to limit the scope of this patent. Rather, the inventors have contemplated that the claimed subject matter might also be embodied in other ways, to include different steps or elements similar to the ones described in this document, in conjunction with other present or future technologies. Moreover, although the term "step" may be used herein to connote different aspects of methods employed, the term should not be interpreted as implying any particular order among or between various steps herein disclosed unless and except when the order of individual steps is explicitly described.

As referred to herein, the term "computing device" should be broadly construed. It can include any type of device including hardware, software, firmware, the like, and combinations thereof. A computing device may be operatively configured with a refreshable Braille display. For example, the Braille display may be integrated within the computing device or a peripheral device. The computing device may be configured to communicate instructions to the Braille display for displaying Braille characters. A computing device may include one or more processors and memory or other suitable non-transitory, computer readable storage medium having computer readable program code for implementing methods in accordance with embodiments of the present disclosure. A computing device may be, for example, a processing circuit for the image optimization using a mobile computing device. In another example, a computing device may be a server or other computer located within a commercial, residential or outdoor environment and communicatively connected to other computing devices for the image optimization using a mobile computing device. In another example, a computing device may be a mobile computing device such as, for example, but not limited to, a smart phone, a cell phone, a pager, a personal digital assistant (PDA), a mobile computer with a smart phone client, or the like. In another example, a computing device may be any type of wearable computer, such as a computer with a head-mounted display (HMD). A computing device can also include any type of conventional computer, for example, a laptop computer or a tablet computer. A typical mobile computing device is a wireless data access-enabled device (e.g., an iPHONE® smart phone, a BLACKBERRY® smart phone, a NEXUS ONE™ smart phone, an iPAD® device, or the like) that is capable of sending and receiving data in a wireless manner using protocols like the Internet Protocol, or IP, and the wireless application protocol, or WAP. This allows users to access information via wireless devices, such as smart phones, mobile phones, pagers, two-way radios, communicators, and the like. Wireless data access is supported by many wireless networks, including, but not limited to, CDPD, CDMA, GSM, PDC, PHS, TDMA, FLEX, ReFLEX, iDEN, TETRA, DECT, DataTAC, Mobitex, EDGE and other 2G, 3G, 4G and LTE technologies, and it operates with many handheld device operating systems, such as PalmOS, EPOC, Windows CE, FLEXOS, OS/9, JavaOS, iOS and Android. Typically, these devices use graphical displays and can access the Internet (or other communications network) on so-called mini- or microbrowsers, which are web browsers with small file sizes that can accommodate the reduced memory constraints of wireless networks. In a representative embodiment, the mobile device is a cellular telephone or smart phone that operates over GPRS (General Packet Radio Services), which is a data technology for GSM networks. In addition to a conventional voice communication, a given mobile device can communicate with another such device via many different types of message transfer techniques, including SMS (short message service), enhanced SMS (EMS), multi-media message (MMS), email WAP, paging, or other known or later-developed wireless data formats. Although many of the examples provided herein are implemented on smart phone, the examples may similarly be implemented on any suitable computing device, such as a computer.

As referred to herein, an actuated dot structure may function as a "Braille pin," "Braille dot," "pin," or "dot". The actuated dot structure may be the dynamic mechanical analogue to the Braille-dot of an embossed book page. The dot provides tactile feedback, such that a reader can sense its state as either "up" (dot is present) or "down" (dot is not sensed and effectively absent). The vertical distance between these two states is standardized, in this country by the National Library Service for the Blind and Physically Handicapped (NLS). Also standardized is the dot-to-dot (and thus the pin-to-pin) spacing which is about 2.34 mm.

As referred to herein, a "cell" may be an array of actuated dot structures (either 2×3 standard or 2×4 extension) which form a unit of information, such as a Braille character and/or system meta, for presentation to the user in a digital display.

As referred to herein, a "Braille display" or "Tactile display" may include an array of actuated dot structures (may be a small subset of a forty (40)×twenty-eight (28) standard page, or an eighty (80)×twenty-eight (28) in order to support TTY standard width). The lateral dot-, cell-, and line-spacings is standardized by the NLS. A Braille or tactile display may refer to any device with tight constraints on pin spacings, movement, force, or dimension; the only typical constraint is that all pins have equidistant or about equal spacing.

As referred to herein, a multimorph may be any multi-layer element or component capable of being displaced by actuation or activation. For example, a multimorph may be a cantilever having two active layers. The active layers may include piezoelectric polyvinylidene difluoride (PVDF) thin films that are suitably bonded together. For example, there may be two or more PVDF thin films bonded together. In another example, the multimorph may be a bimorph cantilever having a piezoelectric layer and a metal layer. In an example, display may be produced via electrical activation in which an electric field causes one layer to extend and the other layer to contract. In another example, displacement may be produced via thermal activation in which a temperature change causes one layer to expand more than the other. The active layers may also include non-piezoelectric material other than metal, such as plastic spacers and air gaps, to offset particular active layers in which sheer stress at their boundary is not desired. For example, the multimorph may be two bimorphs with an intermediary layer that bonds together only specific points of the bimorphs to one another, such as both ends.

In accordance with embodiments, a Braille display is disclosed that includes an electroactive polymer actuated dot structure. The structure may be fabricated at low cost and provide high performance. Further, the structure may be portable and be implemented in a reliable, full page, refreshable Braille display. The actuated dot structure may refresh Braille dots instantly or quickly through the switching of a piezoelectric PVDF multimorph actuator and novel latching structures. The actuated dot structures disclosed herein may significantly reduce the demand for the tolerance of each part in the Braille cell while keeping its high performance characteristics such as large displacement and supporting force for the actuated dot structure and very short response time. Thus, power consumption and manufacturing cost can be significantly low.

FIG. 1A illustrates a perspective view of an actuated dot structure 100 in an unlatched position in accordance with embodiments of the present disclosure. The dot structure 100 may be one of multiple dot structures assembled within a Braille display for raising a pin 104 in a direction indicated by arrow 105 and for lowering the pin 104 in an opposing direction. The pin 104 may contact or otherwise engage a flexible diaphragm 106 to raise the diagram 106 in the direction of arrow 105 such that it may be sensed by touch of a person's finger. In addition, the pin 104 may be lowered such that it does not touch the flexible diaphragm 106 such that the diaphragm is flat or substantially flat along that portion. The dot structure 100 may be operatively connected to suitable control circuitry for actuation such that the pin 104 can be raised, lowered, and latched.

The actuated dot structure 100 includes a housing 102 for supporting or holding the pin 104. In this example, the housing 102 is a rigid, substantially flat and rectangular-shaped component, although it should be understood that the housing may include any number of components of various shapes and sizes for supporting or holding the pin or any other components of the actuated dot structure. This example figure does not show some other components of the housing 102 for ease of illustration. The flexible diaphragm 106 may be suitably attached to the housing 102 and/or the pin 104. In this example, a top end 108 of the pin 104 may controllably engage with the flexible diaphragm 106 when the pin 104 is raised. In this way, the contacted portion of the flexible diaphragm 106 may be raised for touch by a person. Conversely, the pin 104 may be controllably lowered that it does not contact the flexible diaphragm 106.

The dot structure 100 may include a multimorph 110 that is configured to engage with the pin 104 such that, when actuated, the multimorph 110 extends to displace or move the pin 104 in the direction of arrow 105 for engaging the diaphragm 106. Conversely, in an unactuated state, the multimorph 110 may shorten such that the pin 104 moves in a direction that opposes the direction of arrow 105. In this way, controllable actuation of the multimorph 110 can cause the pin 104 to raise and lower for selective engagement of the diaphragm 106.

The multimorph 110 may be configured to latch the pin 104 in engagement with the diaphragm 106. The multimorph 110 may be an assembly of two piezoelectric layers in contact with each other such that an applied voltage causes one to expand and the other to contract, converting electrical signals into mechanical energy or displacement, as will be understood to those of skill in the art. As an example, the two piezoelectric layers may extend or retract causing a displacement of any attached structure, such as the pin 104. Conversely, bending two piezoelectric layers can generate a voltage which may be used to sense a displacement of any structure attached to the two piezoelectric layers, such as the pin 104. In this manner, the actuated dot structure may sense a depression or displacement of the dot by an object such as a finger, as an example.

The multimorph 110 may be a PVDF multimorph and may function as a biasing element. The multimorph 110 may also be referred to as a multi-layer multimorph having multiple layers of thin film material. The multimorph 110 may provide a supporting force which may function with spring-like characteristics to raise or lift the pin 104 for engagement with the flexible diaphragm 106. In an example, the multimorph 110 may be suitably integrated with one or more electrodes to provide for sensing or detecting which pins are being pushed down (e.g., by a user of the system). This may be useful for the operation of the display. As an example, the multimorph 110 may be a hybrid multimorph, wherein the hybrid multimorph uses different sizes of layer thickness (e.g., one 28 micron film+one 9 micron film or between about 5 μm and about 50 μm). The biasing spring can be an active PVDF multimorph or an inactive cantilever made of PVDF thin film. If using an active PVDF multimorph as biasing spring, the multimorph spring can also provide voltage signal. This feature can be used to fabricate an interactive Braille display on which icons and dropdown menus can be opened. The size of the active biasing multimorph includes thickness and dimension. The range for the thickness of the biasing multimorph can be between about 10 μm and about 200 μm with the thickness of the two layers of the PVDF thin films can be between about 5 um and about 100 μm. The range for the dimension of the biasing multimorph can be from width 1 mm by length 2 mm to width 3 mm to length 15 mm. For the biasing spring made of inactive PVDF cantilever, the size range for the thickness, width and length of the biasing spring can be the same as those for the active multimorph. In an example, a hybrid multimorph may be used to adjust the supporting pressure of engagement between the pin 104 and the flexible diaphragm 106. The supporting pressure of engagement between the pin 104 and the flexible diaphragm 106 of the multimorph 110 may be adjusted to within the specified NLS target biasing or supporting force. In this example, the multimorph 110 can function as the biasing element.

With continued reference to FIG. 1A, the pin 104 may define latching portions 112 positioned to operatively engage respective latching portions 114 of the multimorph 110. The latching portions 114 of the multimorph 110 and the latching portions 112 of the pin can latch together when the multimorph 110 is actuated. FIG. 1A shows the actuated dot structure 100 in an unlatched position in which the pin end 108 is not engaged with the diaphragm 106. Conversely, FIG. 1B illustrates a perspective view of the actuated dot structure 100 in a latched position with the pin end engaging the diaphragm in accordance with embodiments of the present disclosure.

The actuated dot structure 100 may be actuated by applying an electrical bias to the multimorph 110. When the electrical bias is applied, the multimorph 110, as described above, may be compressed downward (in a direction as indicated by direction arrow 115) in the direction of the housing 102, thus extending the pin 104 towards the flexible diaphragm 106. In this manner, the pin 104 may resists a downward force with sufficient counter force so as to enable the downward force (e.g., a user's finger) to feel or sense the pin as a Braille dot, as an example. Alternatively, the latching portions 114 of the multimorph 110 may be inverted, wherein the latching portions 114 of the multimorph 110 are attached to the pin 104 and engage a supporting portion on the housing, similar to the latching portion 112. However, the latching portion 112 in this alternative embodiment may provide a supporting force in the direction of the flexible diaphragm 106. When the multimorph 110 is actuated with appropriately charged pairs of electrodes 116 arranged along the device's length, a multimorph 110 profile is generated. Pairs of electrodes 116 may also be placed in varying positions on the multimorph 110. The electrode 116 placement and charge adds a degree of freedom to the motion of the multimorph tip and subsequently the pin 104. In this manner, the available pin 104 motion is now 2-dimensional. Thus, the top end 108 of the pin 104 may not be limited simply moving up or down by the arcing motion of the multimorph, but rather the distance between adjacent dots as will be described herein may be adjusted or modulated by tuning the relative curvatures of the multimorph 110. The tuning of the relative curvatures of the multimorph 110 may be performed by adjusting the potentials of the electrode pairs 116 and the placement of the electrode pairs 116 on the multimorph 110. It is noted that electrodes pairs 116 may alternatively be provided in any number of electrodes, including a single electrode or multiple electrodes as appropriate.

With continued reference to FIGS. 1A and 1B, the multimorph 110 may include two (2) portions, an active portion 118 and a passive portion 120. The active portion 118 may be of a first width and the passive portion 120 may be of second width, wherein the first width and the second width may or may not be the same width. The active portion 118 may include a plurality of electrodes for receiving the bias voltage. The active portion 118 may also include a plurality of layers, each layer may include a plurality of electrodes 116. In some embodiments, the active portion 118 may include the latching portion 112. The passive portion 120 may include electrodes 116 and may be sufficiently flexible so as to provide an appropriate supporting force. In some embodiments, the passive portion 120 may be only a single layer.

With continued reference to FIGS. 1A and 1B, multiple actuated dot structures 100 may be assembled into a cell of, for example, 2 columns and 3 rows of actuated dot structures 100. Each cell may represent a single Braille character or symbol. Further, a plurality of cells, as defined herein, may be assembled into a full display or page of Braille characters or symbols. A display or page may be, for example, an eighth (1/8th) page of forty (40)×four (4) cells. Additionally, a full display may be of any size range of cells, including a page of eighty (80)×twenty (25) cells with an approximate size of fourteen (14")×twenty-two (22") inches. It is noted that any size page including any number of rows and/or columns of cells may be used.

Figure 2:
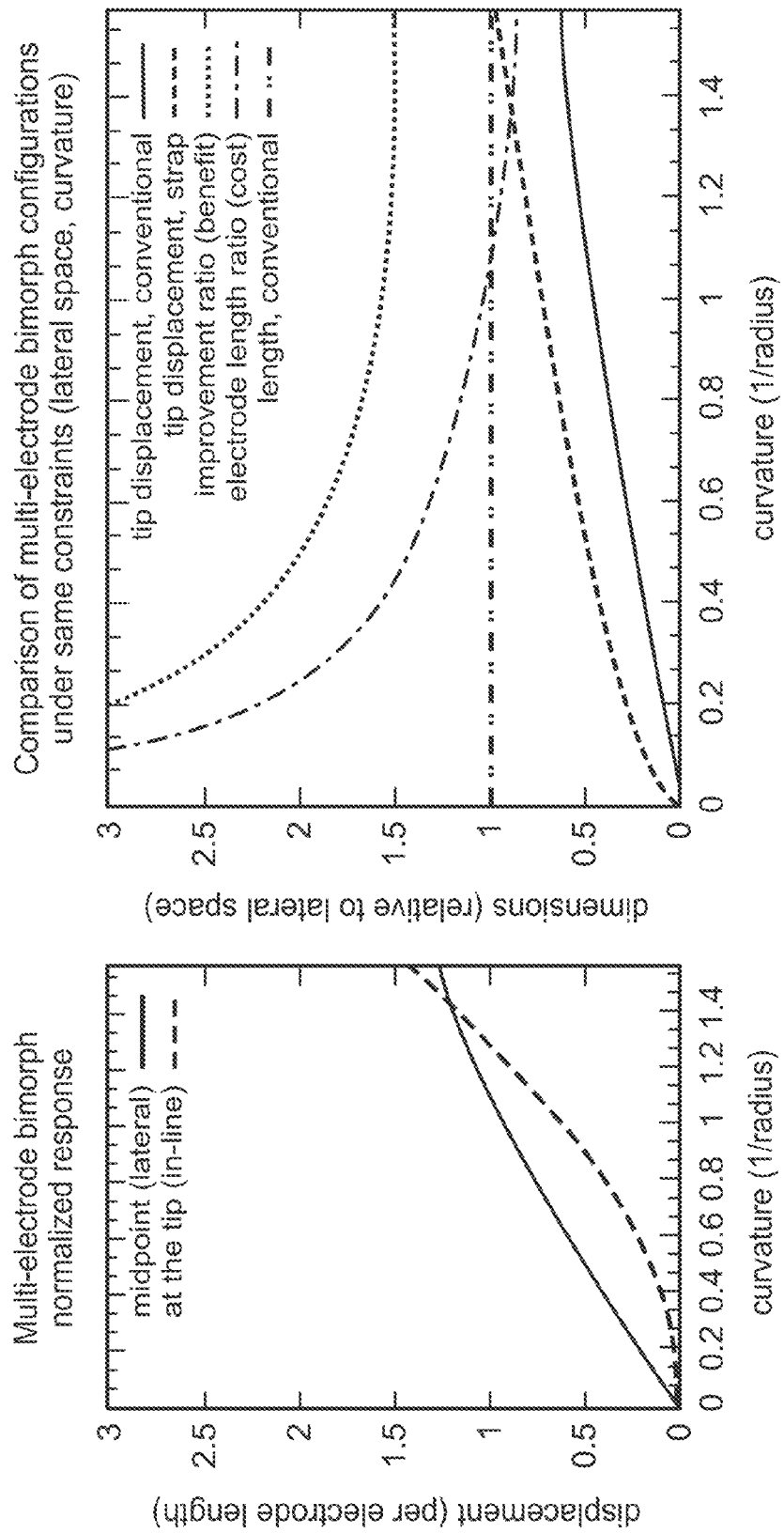
FIG. 2 are two graphs showing a multi-electrode strap normalized response and a comparison of multimorph configurations.

FIG. 2 illustrates two graphs of a multi-electrode strap normalized response and a comparison of PVDF multimorph configurations in accordance with embodiments of the present disclosure. A PVDF multimorph can provide sufficient tip displacement for pushing a supporting portion into a latching position. In an example, the pin displacement distance can be about 0.7 mm. Table 1 sets forth data for an example tip or top end displacement of an example PVDF multimorph versus length and bias voltage.

TABLE 1

| 12.7 mm Series-Connected Multimorph | |
|---|---|
| Volts | Displacement (mm) |
| 90 | 0.05 |
| 290 | 0.19 |
| 490 | 0.30 |
| 690 | 0.43 |
| 890 | 0.57 |
| 1090 | 0.69 |
| 1290 | 0.85 |
| 1490 | 1.00 |

In this example, for a bias of 490 V, 12.7 mm long PVDF multimorph 110, the tip displacement is about 0.30 mm. It is shown that the relationship between tip displacement of the multimorph and its length can be represented by the equation D=constant*L 2. If the driving voltage and thickness of the PVDF multimorph are kept constant and the length changed to 16 mm, Displacement=0.3(16*16/12.7*12.7)=0.477 mm. When voltage is applied to the PVDF multimorph, the multimorph will bend and its tip will make displacement. 0.7 mm tip displacement is needed to move the supporting block into the latching position to secure the latch. The experimental data listed in the patent is for a series connected PVDF multimorph with length 12.7 mm. There are two ways to make PVDF multimorph. One is series connected and the other is parallel connected. Series connected means two layers of PVDF thin films are glued together with their polarization opposite each other without central electrode. The electrode is made on the two outside surface of the multimorph. When voltage is applied to the electrode, electric potential is provided across the two layers of the PVDF thin films. One layer will expand and the other can contract. Stress can formed along the interface of the two layers and the multimorph can bend to make tip displacement. For the parallel connected multimorph, there is a central electrode. Voltage can be applied to each single layer of the PVDF thin film itself. So, for the same applied voltage, the electrical potential can be doubled for the parallel connected multimorph compared to that of series connected multimorph. Less than 500 V driving voltage is desired because higher driving voltage will increase the fabrication cost. If we look at the data listed, the tip displacement is 0.3 mm with applied voltage 490 V for a series connected multimorph with length 12.7 mm. We would like to see what we can do base on this data to make a multimorph that can provide 0.7 mm tip displacement with applied voltage less than 500 V. The tip displacement is proportional to applied voltage V times square of the length of multimorph. So, by increasing the length of the multimorph, the tip displacement can increase. As an example, we choose to increase the length of the multimorph from 12.7 mm to 16 mm. The calculation result shows that the tip displacement increases from 0.3 mm to 0.477 mm. This is for series connected multimorph. We can further increase the tip displacement by changing series connected multimorph to parallel connected multimorph. This can double the electrical potential within PVDF thin film and double the tip displacement. The tip displacement can become 2*0.477=0.95 mm. 0.95 mm tip displacement can make very secure latching. This is just an example. The length of the multimorph can be increased to certain value to achieve 0.7 mm tip displacement with applied voltage less than 500 V.

Figure 3:
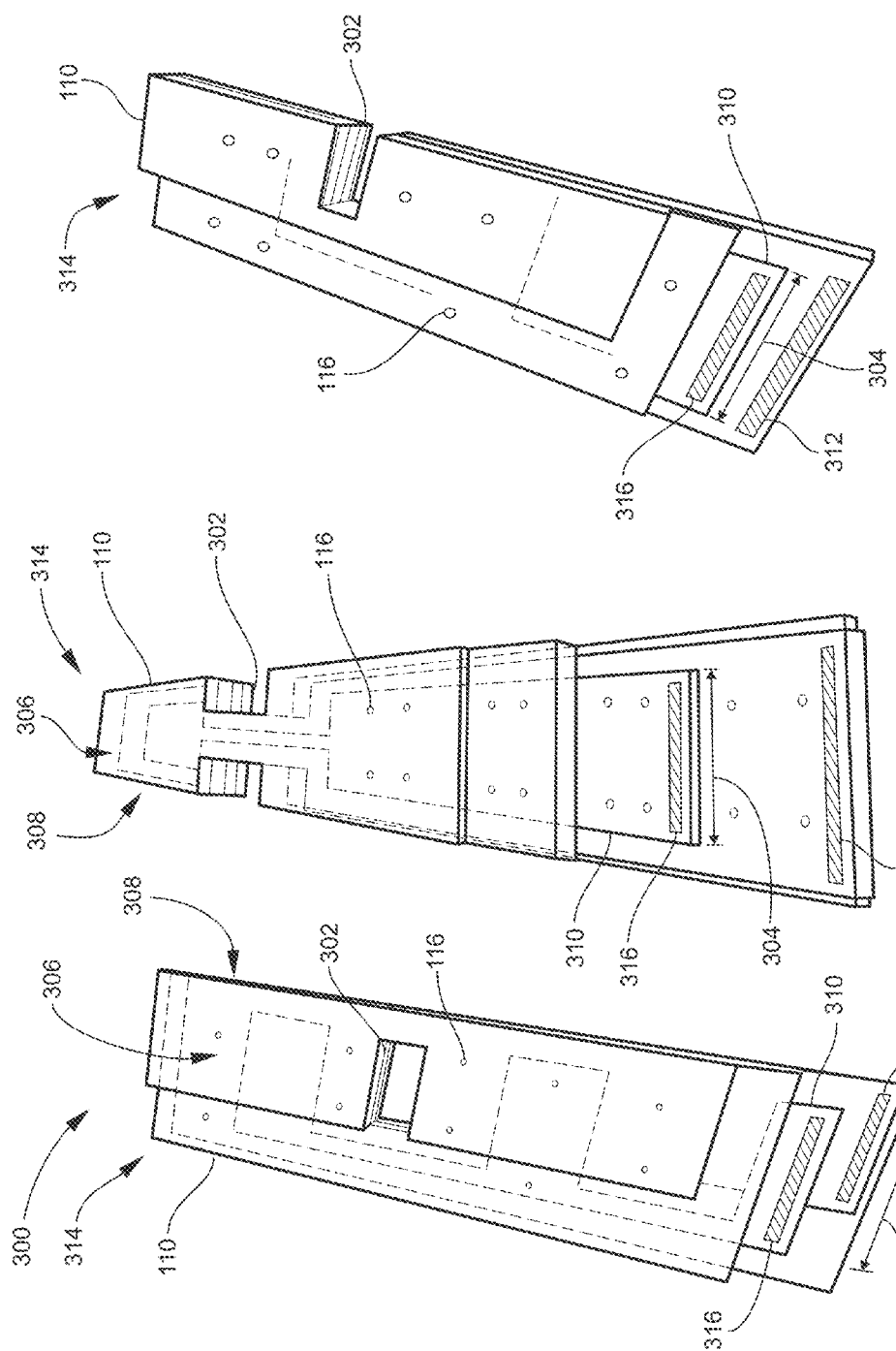
FIGS. 3A-3C illustrate three (3) different perspective views of configurations for example multi-electrode multimorphs with latching components in accordance with embodiments of the present disclosure.

FIGS. 3A-3C illustrate three (3) different perspective views of configurations for example multi-electrode multimorphs 300 with latching components in accordance with embodiments of the present disclosure. Referring to FIGS. 3A-3C, the multi-electrode multimorph 300 may include 3-port parallel-mode actuators with outer-active electrodes. This example of the PVDF multimorph 300 may include three layers of patterned electrodes 116 and sections of notched 302 and/or narrowed actuator width 304, as an example. Additional layers may be used for construction as desired. The multi-electrode multimorph 300 design and wiring may be such that electrical fields, generated by the differing electrode potentials and placement, are isolated from the exposed surfaces; electrostatic discharge or other effects to neighboring structures, such as adjacently placed actuated dot structures, may be prevented. The multi-electrode multimorph 300 may be operable to actuate the pin 104 height, and once in an engaged position, simultaneously engage a latching mechanism which provides high blocking force to the pin. The latching mechanism may be the latching portion of a pin or other mechanism including a protrusion formed into the housing configured in alignment with the notch 302.

With continued reference to FIGS. 3A-3C, the multi-electrode multimorph 300 may include an outer surface 306, 308 (e.g., top layer and bottom layer) electrodes which may be grounded, wherein only the electrodes 116 on the boundary of an inner layer 310 may be high voltage (HV). Using only the inner layer 310 boundary, electrode(s) 116 may also be configured with patterned electrodes 116, to provide sufficient field isolation for high voltage actuated dot structures 100. A layer electrode contact 312 may be placed at one end, which may be an anchor both mechanically and electrically, with an opposing layer end 314 free to move as configured or guided by the housing 102 structure. Because both the outer surface 306, 308 electrode(s) 116 may be electrically grounded, the outer surface 306, 308 electrode(s) 116 can be connected via direct contact with a conductive frame (not shown), as an example. The inner layer 310 electrode(s) 116, on the other hand, may be wired, and an inner layer 310 electrode contact point(s) 316 may be exposed by trimming one fluoropolymer layer slightly shorter than the other, at the fixed end. A bias voltage may be generated separately in each fluoropolymer layer 306, 308, 310, thus the bias voltage on the inner layer 310 electrode(s) 116 can act to efficiently tune the movement of the multimorph 110 for bending in any desired direction.

As described above, the multi-electrode multimorph 300 may bend with simultaneous multiple curvatures. Effectively, the application of the bias voltage may translate to a lateral position of the mid-point along multimorph 110 length. Overlap of the electrodes 116 in the layers 306, 308, 310 may be maximized at the ends, and minimized (or zero) in the section near a midpoint, where an opposing curvature is desired. Aiding in this curvature formation, mechanical stiffness of the varying portions of the layers may be adjusted by slots/notches which may be cut for latching with the pin 104 and housing 100. Both the pin 104 and the housing inner wall surface may contain structures or protrusions described herein, which are aligned and mate with the multimorph 110 edges and surface when actuated with an applied bias voltage resulting in a sufficient blocking force.

FIGS. 4A-4D illustrate four (4) dimensional views of configurations for example multi-electrode multimorphs 300 with latching components in accordance with embodiments of the present disclosure. The multi-electrode multimorph 300 shown in FIG. 4A may have the passive portion 120 defined to a second width to create the latching portion 114 so as to engage a corresponding latching portion 112 with downward pressure. A blocking force may be achieved by actuation of the active portion 118, as long as downward pressure does not exceed the multi-electrode multimorph 300 buckling condition. Once the buckling condition occurs, the blocking force may reduce until the downward pressure is removed, thus allowing the multi-electrode multimorph 300 to reset.

Figure 4:
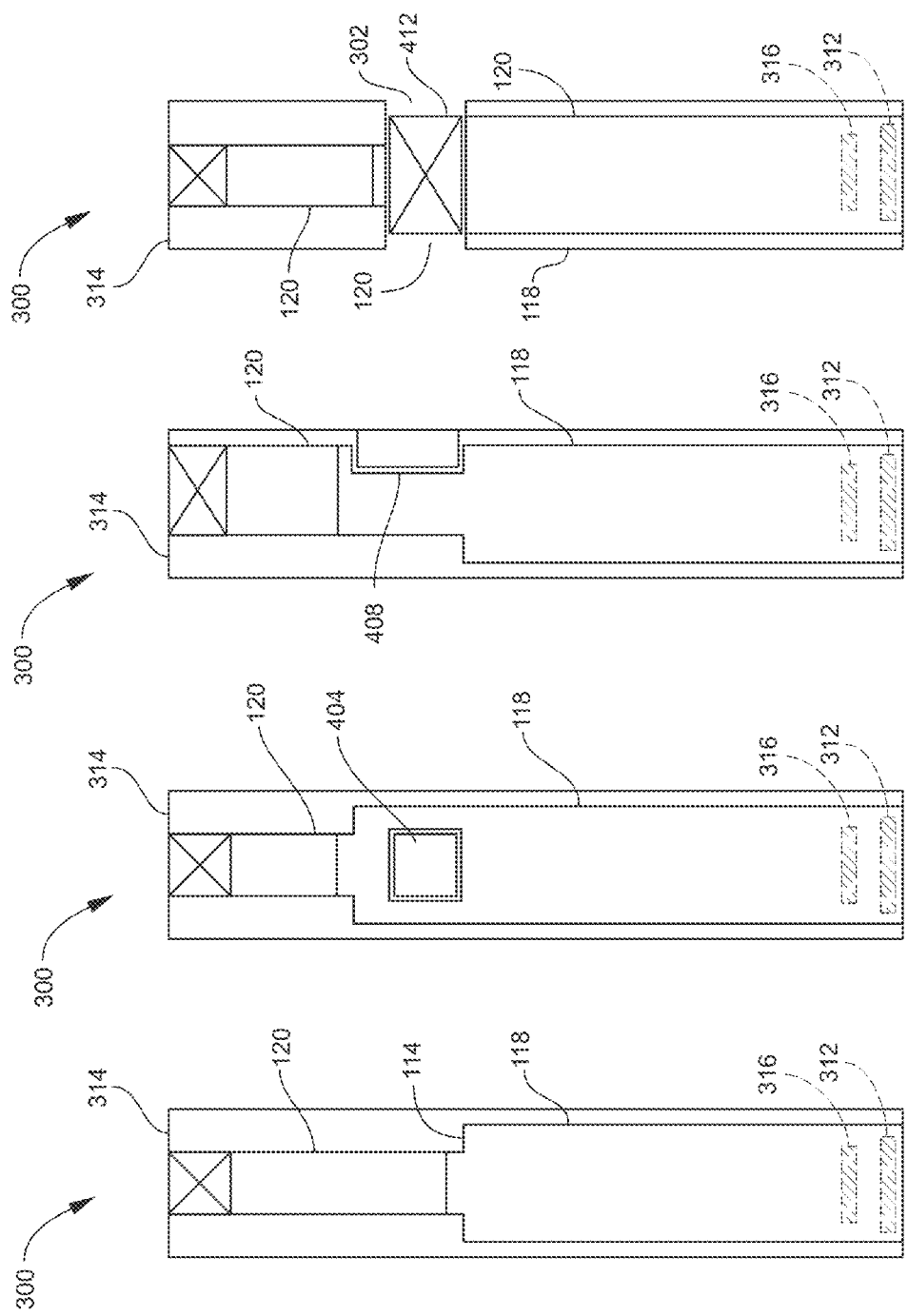
FIGS. 4A-4D illustrate four (4) dimensional views of configurations for example multi-electrode multimorphs with latching components in accordance with embodiments of the present disclosure.

FIG. 4B shows the multimorph 300 with a central slot 404, added near the juncture between the active portion 118 and the passive portion 120. A protrusion included in the housing 102 may extend through the central slot 404. In this manner, a blocking force is created, resisting downward pressure applied to the pin 104.

FIG. 4C shows the multimorph 300 with a side slot 408 which operates in a similar fashion to the central slot 404.

FIG. 4D shows the multimorph 300 as being similar to the multimorph of FIG. 4B but inverted. Referring to FIG. 4D, a block 412 is attached to the multi-electrode multimorph 300 rather than the housing 102 with an aligned mating slot formed into the housing 102. As described herein, a multimorph 110 or multi-electrode multimorph 300 may include a laminated stack of materials in which one side is forced to expand at a different rate. In some embodiments one side may expand at an equal but opposite rate, to an opposing side. The active portion 118 may include a plurality of piezoelectric layers, with electrodes 116 at the boundaries between the layers, and polarities oriented accordingly. To improve the electrical field strength relative to the electrode 116 bias voltage, the plurality of layers may include more than two layers. In a parallel-mode electrode configuration the electrical field strength may double as compared to a serial-mode configuration. The electrical field strength may double because an electrode 116 is added in the inner layer, dividing the distance between adjacent electrodes.

Figure 5:
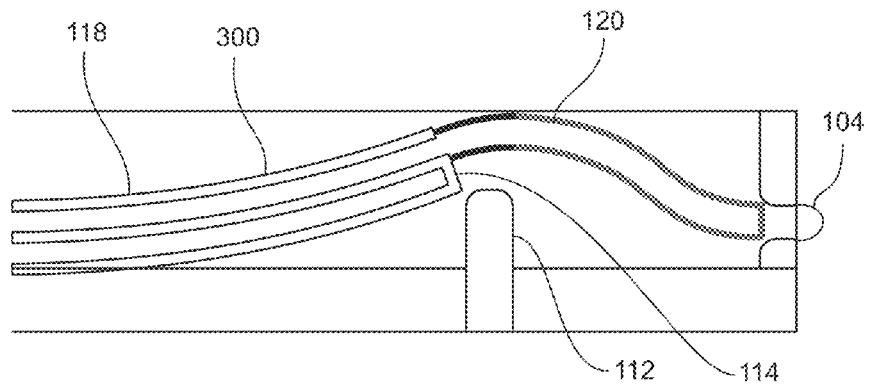
FIG. 5-8 illustrate cross-sectional side views of example multi-electrode multimorph, latching mechanisms in accordance with embodiments of the present disclosure.
Figure 6:
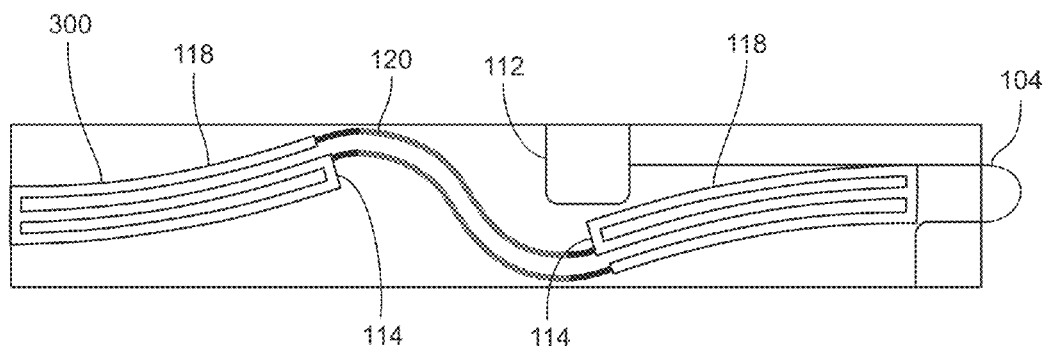
Figure 7:
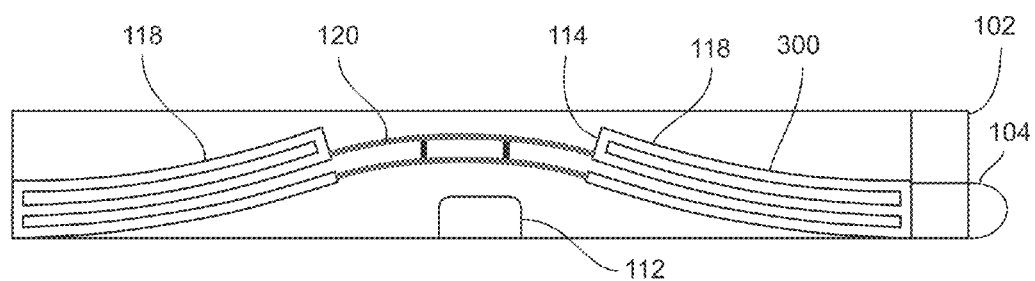

FIGS. 5-8 illustrate cross-sectional side views of example multi-electrode multimorph, latching mechanisms in accordance with embodiments of the present disclosure. The mechanisms can each include a multi-electrode multimorph 300. The multimorph 300 can be configured with either the active portion 118 or the passive portion 120 affixed to the housing 102 for providing an anchor point. The multimorph 300 can also be implemented with active portions 118 at both ends including the passive portion 120 in the midsection as shown in FIGS. 6 and 7, actuated either in same direction or opposite direction of curvature.

Figure 8:
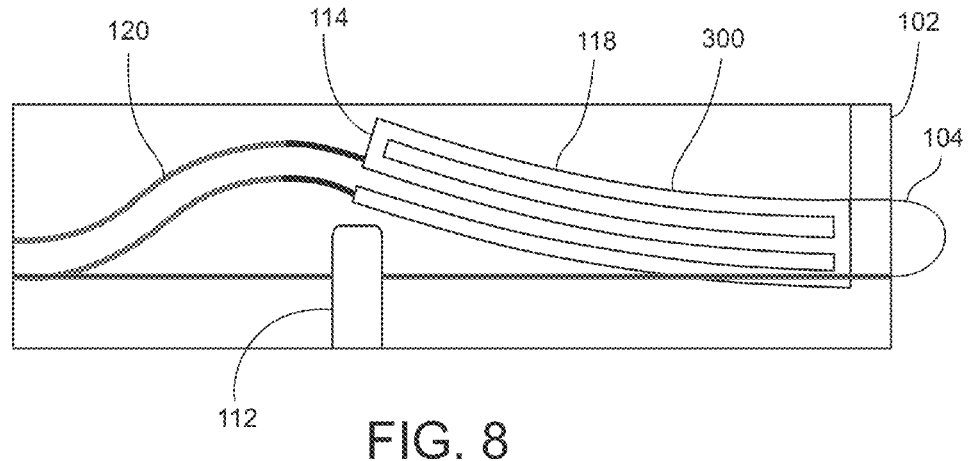

FIG. 5 illustrates layer stack of active section 118 and 300 extending below the layer which comprises passive section 120; this is to demonstrate that layer stacking can extend to either side or both sides, so long as appropriate electrode voltages are provided. In FIGS. 6-8, passive sections 120 are illustrated as a single layer. Wiring through these sections is necessary to electrically connect active sections 118 and 300 to one another and to the contact points. By using a single layer between wires, activation of the material does not create added bending force within the passive section 120.

FIG. 6 shows a configuration which can induce greater curvature in the passive region. It illustrates that if passive section 120 exists as an extension of an outer layer of the multimorph layer stack, then active section layer stacks 118 and 300 can extend to opposite sides (i.e., to top and bottom of passive) in order to provide opposing curvatures).

FIG. 7 illustrates active regions 118 and 300 which curve in the same direction, in order to obtain a latching mechanism with greater displacement from the block 112.

FIG. 8 illustrates the reversal of that in FIG. 5, in which the passive region provides attachment of multimorph to the housing 102. This provides the opportunity, as with FIG. 6, to use buckling stiffness of the active sections 118 (connecting with pins 104) as a parameter which controls the release of latch engagement to blocks 112. When external force on pins 104 exceeds this parameter, the multimorph momentarily loses capability to transfer blocking force between block 112 and pin 104, resulting in disengagement from block 112. Subsequently, material stiffness and newly-gained freedom of movement allow multimorph to distribute strain along its full length. Thus, multimorph may regain its programmed curvature following disengagement and removal of external force.

Figure 9A:
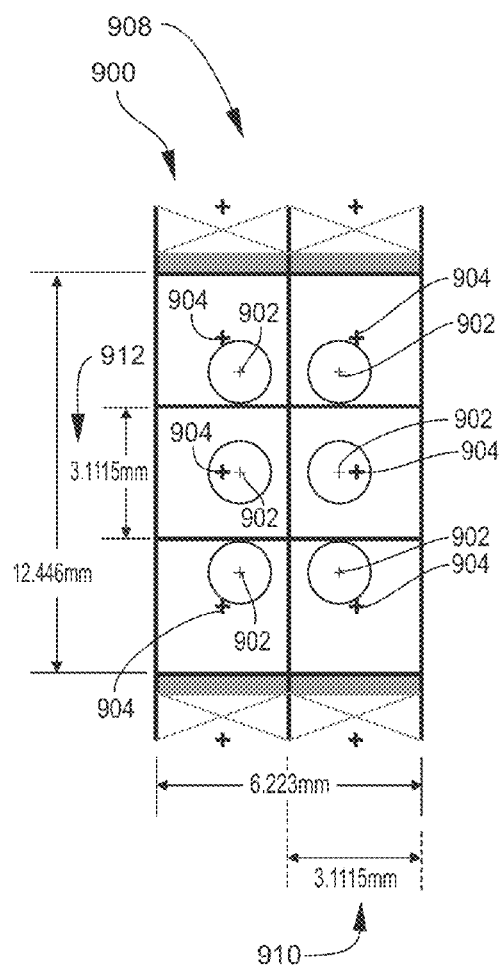
FIGS. 9A and 9B illustrate example layouts of multimorph placement in accordance with embodiments of the present disclosure.
Figure 9B:
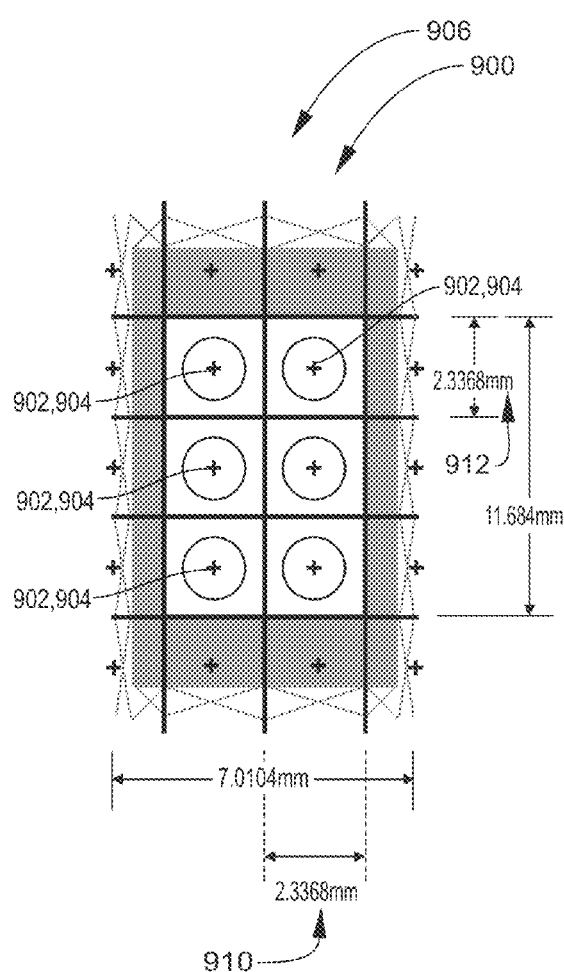

FIGS. 9A and 9B illustrate example layouts of multimorph placement in accordance with embodiments of the present disclosure. These layouts meet specifications published by the National Library Service for the Blind and Physically Handicapped (NLS) in accordance with embodiments of the present disclosure. NLS specification lists several pin 104 spacing guidelines. The spacings of the pins 104 can be such that a user can easily identify not only a 2×3 pattern of pin 104 included in each cell 900, but also may easily identify the cell boundaries and orientation of display lines. In order for the cells 900 to be unambiguously discernable within the context of a page, extra spacing may be added around them as follows: an extra ⅔ nominal spacing separates cells 900 to the left and right (e.g., (6.223−2*2.3368) mm vs 2.3368 mm on each side), and an extra one and one-third (1⅓) nominal spacing separates lines above and below.

The fractional spacings of the pin may be desired for a display of braille to contrast with the display of tactile graphics. With tactile graphics only, single and regular spacing may be desired. FIGS. 9A and 9B demonstrate the difference, by overlaying one display spacing upon the other. Base diameters and centers of the six (6) pins and associated top ends are shown with a first mark 902, while a regular grid pattern is illustrated with a second mark 904. A regular grid 906 assumes a spacing equal to the inter-cell pin spacing. Mechanisms arrayed with these example dimensions and pitch would provide tactile graphics at a higher dot density. However, the spacing between Braille cells and lines should be expanded in order maintain discernibility. Illustrated dimensions are exemplary, the actuated cell structures may be assembled in any dimension. An offset grid 908 may be defined according to the cell-to-cell spacing within a line. Pins may be offset, Doted by the second mark 904, from the cavity centers, noted by the first mark 902, for the purpose displaying Braille, and only line spacing may be enlarged. However, this grid provides a less dense tactile graphics display, with the illustrated example dimensions in the offset grid 908 being larger than the regular grid 906. The actuated dot structure may be constructed to any suitable width 910 and any thickness 912.

Figure 10:
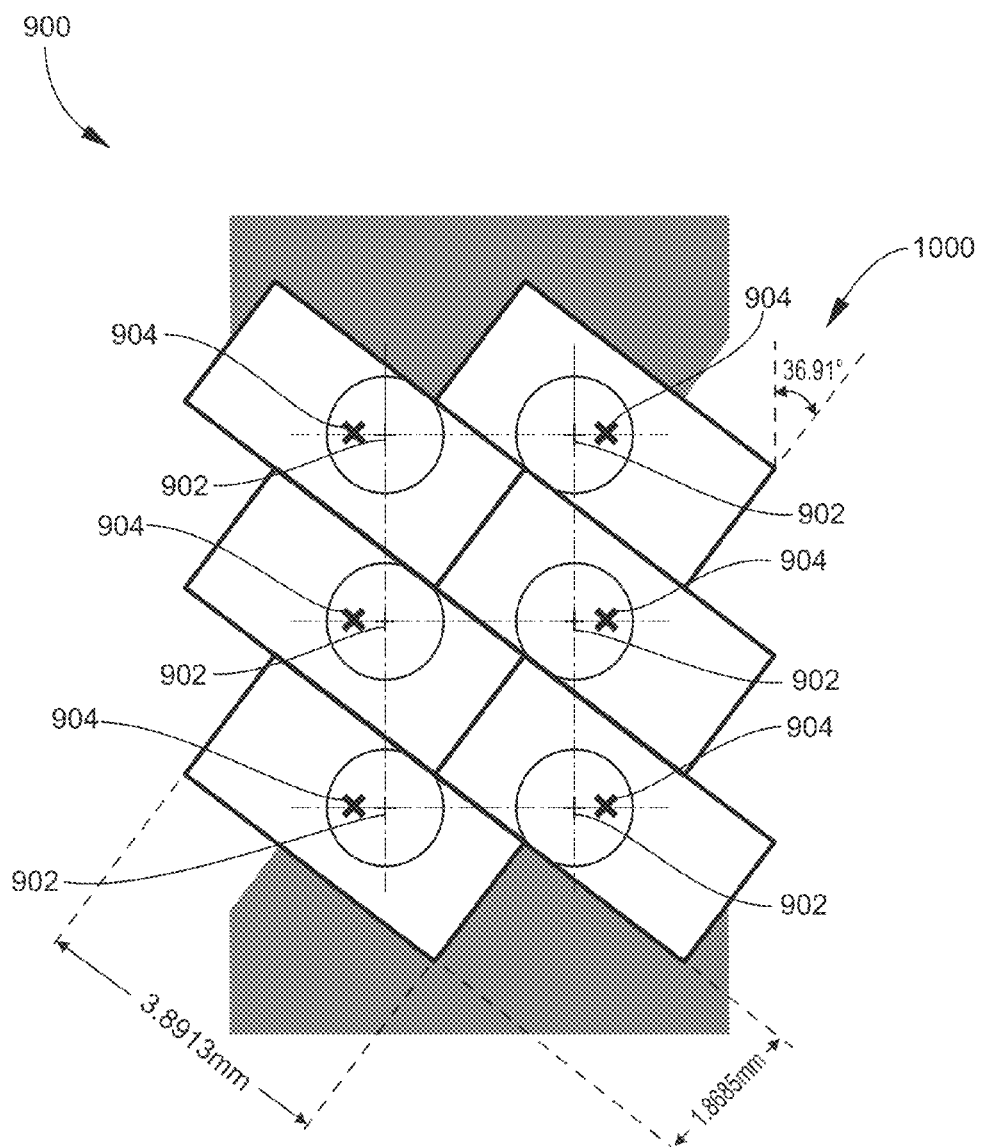
FIG. 10 illustrates a diagram of an example of a cross-cell layout configuration in accordance with embodiments of the present disclosure.

FIG. 10 illustrates a diagram of an example of a cross-cell layout configuration in accordance with embodiments of the present disclosure. The density needed to accommodate the actuated dot structure, since it is intended to reside within a region beneath and relative to each pin, may depend on the display product or application. Viewed as a projection onto the display surface, the pin region may be seen as rectangular, as illustrated in FIG. 9, with one dimension being available for the width 910 of the multimorph, and the other dimension being available for lateral displacement of the multimorph as defined by the thickness 912. Following the constraints of the NLS braille specification, this diagram demonstrates that an optimal ratio of these dimensions may be obtained, providing actuated dot structures in a regular pattern that is neither limited to being orthogonal to the arrangement of pins, nor exactly centered beneath each pin, as may be seen by the offset of the first mark 902 and the second mark 904. The optimal ratio of these dimensions may be any offset angle 1000. The pin-to-pin spacing in a Braille cell may limit space available for taking up the lateral bend of an actuated cell structure or more specifically the multimorph in the actuator cell structure. In order to maximize this space, a design is provided which also utilizes the space between cells. Furthermore, for more narrow actuated cell structures, this space can be extended further beyond 3.1115 mm) by arranging the cavities on a diagonal. As a result of this maximization, the amount of multimorph curvature necessary to displace the pin can be reduced, and thus also reduce the corresponding voltage. As an example, the offset angle 1000 in FIG. 10 is 36.91° degrees. As disclosed herein, the cell 900 may be made of any number of actuated dot structures 100 (e.g., two (2)×three (3), two (2)×four (4), etc.).

Figure 11:
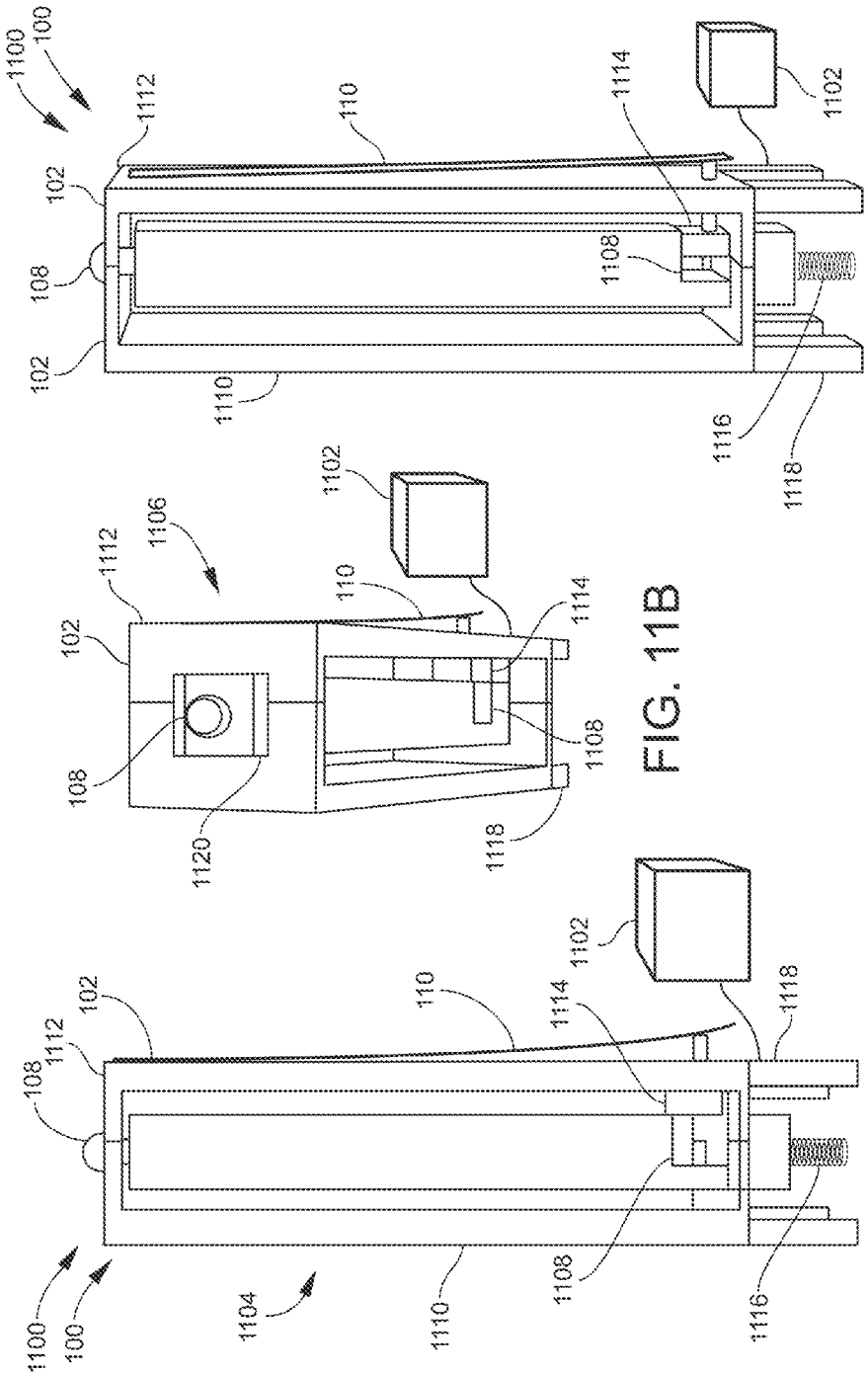
FIGS. 11A and 11B illustrates different perspective views of an actuation system for an actuated dot structure in an unlatched position in accordance with embodiments of the present disclosure.
FIG. 11C illustrates a perspective view of another example actuation system including the actuated dot structure in a latched position in accordance with embodiments of the present disclosure.

FIGS. 11A and 11B illustrates different perspective views of an actuation system 1100 for an actuated dot structure 100 in an unlatched position in accordance with embodiments of the present disclosure. The actuation system 1100 includes an embodiment of the actuated dot structure 100 and a controller 1102. The controller 1102 may be used with any of the disclosed actuated dot structures 100 disclosed herein. The controller 1102 may be a mobile computing devices or other computing device including a processor and memory (not shown). The perspective views in FIGS. 11A and 11B illustrate a side view 1104 and a top perspective view 1106. Referring to the perspective views of FIG. 11A, the actuation system 1100 includes a pin 104 with a hollow opening 1108 for latching, a ninety (90) degree tilted U-shaped left side frame 1110 forming the left side of the housing 102, a second ninety (90) degree tilted U-shaped right side frame 1112 forming the right side of the housing 102. Further, the actuation system 1100 includes the PVDF multimorph 110 with a supporting block 1114 attached to one end, a biasing element 1116 (e.g., modulus spring), and a bottom frame 1118.

As shown in FIG. 11A, the ninety degree tilted U-shaped frames 1110, 1112 form a basic frame structure of the housing 102. The two U-shaped frames 1110, 1112 are coupled in a face to face configuration. The left side frame may support the pin 104 and the left side frame may also in some embodiments support the PVDF multimorph 110. The reason for choosing this configuration is to fully utilize the space surrounding the actuated dot structure 100 to enable a desired performance of all the components in the actuation system 1100. The PVDF multimorph 110 can be fixed on the side wall of the housing 102. When used as a Braille dot, the width of the left and right U-shaped frames 1110, 1112 can be any suitable width, which may be the sum of the base diameter of Braille dot and half of the distance between dots within one cell. Also included is a shaped hole 1120 at the top and bottom edges of left side frame. It is noted that any shape corresponding to the shape of the pin 104 may be used, so as to allow the pin 104 to move up and down through the shaped hole 1120. The pin 104 can include a dome shape Braille dot at its top end 108 and a square shape hollow opening 1108 near its bottom. The square shaped hollow opening 1108 may be in any suitable shape corresponding to the supporting block 1114 and may be placed along the pin 104 in any location as desired including the top end, mid-section or at the bottom, as illustrated. For the right side frame 1112 may include supporting block 1114 extended from the bottom edge of the right side frame 1112 towards the hollow opening 1108. The size of the supporting block 1114 on the right frame matches the dimension of the hollow opening 1108, so that the supporting block 1114 may insert into the hollow opening 1108 to form a latching structure. There is a third frame at the bottom which is used to fix the small biasing element 1116 (e.g., modulus spring) and support the two U-shaped frames 1110, 1112. FIG. 11A shows the actuated dot structure 100 in an unengaged or unactuated state. This is shown by the supporting block 1114 in a position outside of the hollow opening 1108.

FIG. 11C illustrates a perspective view of another example actuation system 1100 including the actuated dot structure 100 in a latched position in accordance with embodiments of the present disclosure. The latched position is illustrated with the supporting block 1114 inserted into the hollow opening 1108 by actuation of the PVDF multimorph 110.

The detailed dimensions of all parts are shown in the FIGS. 11A and 11B may vary according to needs of the actuated dot structure 100. The wall thickness of the top and bottom edges of both sides of the U-shaped frame 1110, 1112 can be 0.3 mm or any suitable thickness based on the desired placement of the associated pin 104. The width of the hollow opening 1108 can be 1 mm or any suitable size according to the supporting block 1114. It may be desired for the pin 104 to travel up and down with 0.8 mm displacement or any suitable displacement along the shaped hole 1120 as shown in FIGS. 11A and 11B. The travel displacement can be between about 0.5 mm and about 1 mm. The biasing element 1116, which may be a small modulus spring, may be fixed on the bottom housing 102. The biasing element 1116 may be used to support or bias the pin 104 in a reading position. It should be noted that the desired purpose of the biasing element 1116 may be to keep the pin in reading position with a relatively small supporting force (e.g., approximately 0.2 grams or between about 0.1 gram and 1 gram). The weight of the pin may be about 0.069 grams. The height of the left and right sides of the frame can be 10 mm or any suitable height. Therefore, the length of the PVDF multimorph 110 can be 10 mm or any suitable length. In example, the length of the multimorph can be between about 5 mm and about 50 mm, and the length of the housing can be between about 5 mm and about 50 mm. The supporting block 1114 may be attached to the lower end of the PVDF multimorph 110. The height of the supporting block can be 0.8 mm or any suitable height (e.g., the height of the desired Braille dot) and the width can be 0.7 mm or any suitable width.

Figure 12:
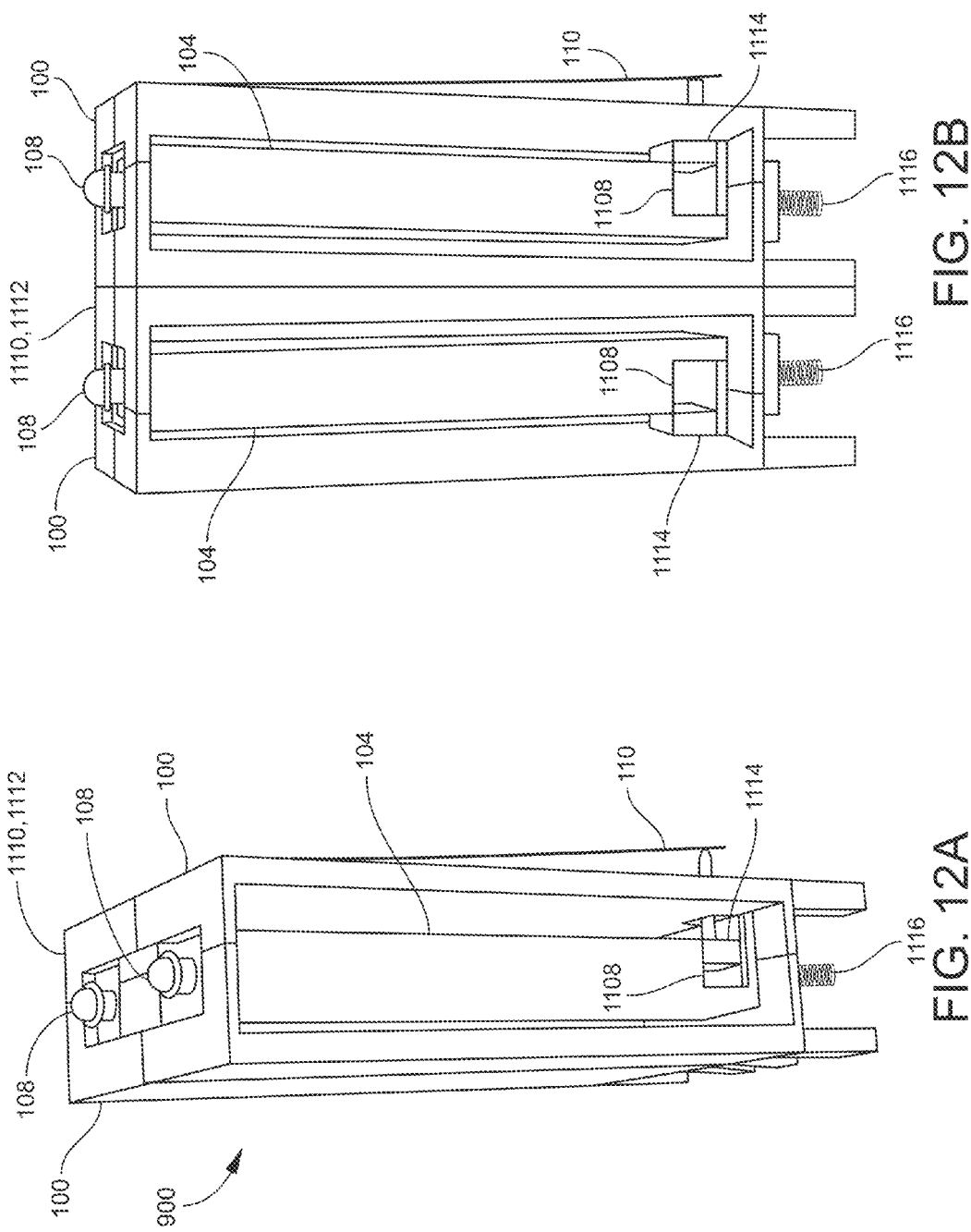
FIGS. 12A and 12B illustrate perspective views of an example assembly of two (2) Braille dot cells in accordance with embodiments of the present disclosure.

FIGS. 12A and 12B illustrate perspective views of an example assembly of two (2) Braille dot cells in accordance with embodiments of the present disclosure. In this example, the actuated dot structures 100 of FIGS. 11A-11C may be coupled together to form the cells 900. Further, in this example, the assembly includes 2 cells; however, it should be understood that the assembly may include any suitable number of cells. The actuated dot structures 100 may be associated and operate in coordination with each other and may be controlled by a controller, such as the controller 1102 shown in FIGS. 11A-11C.

Figure 13:
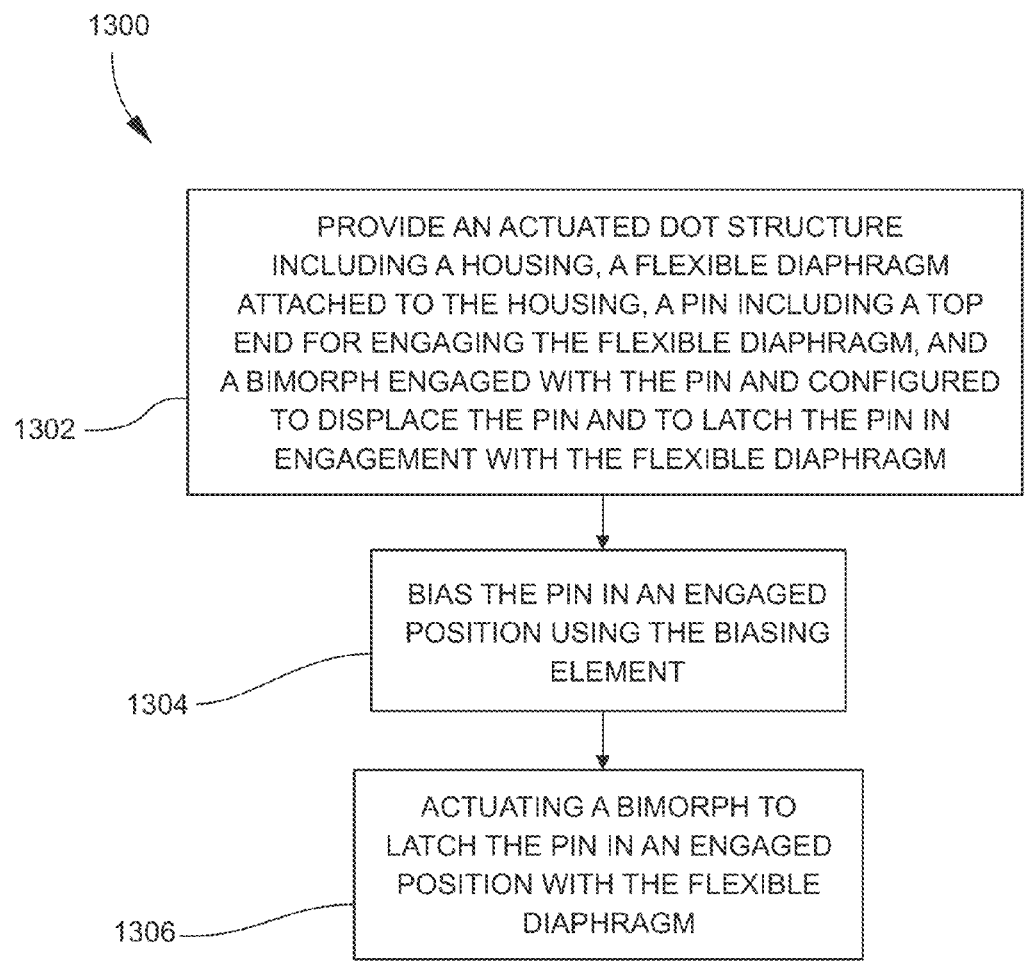
FIG. 13 is a flowchart showing an example method for operating an actuator dot structure in accordance with embodiments of the present disclosure.

FIG. 13 is a flowchart showing an example method 1300 for operating an actuator dot structure in accordance with embodiments of the present disclosure. The method or a similar method may be utilized for operating the actuator dot structures disclosed herein, such as the actuated dot structure 100 shown in FIGS. 1A and 1B. In the following description of FIG. 13, reference is made to the actuated dot structure 100 shown in FIGS. 1A and 1B, although it should be understood that the method may be applied to other actuated dot structures.

Referring to FIG. 13, the method 1300 includes providing 1302 an actuated dot structure including the housing 102, the flexible diaphragm 106 attached to the housing 102. The actuated dot structure. For example, the actuated dot structure 100 of FIGS. 1A and 1B may be provided. The actuated dot structure 100 includes the pin 104 including the top end 108 for engaging the flexible diaphragm 108. The actuated dot structure 100 further includes the multimorph 110 (e.g., PVDF multimorph) engaged with the pin 104, and the multimorph 110 may be configured to displace the pin 104 thereby latching the pin 104 in engagement with the flexible diaphragm 106.

The method 1300 of FIG. 13 may also include biasing 1304 the pin in an engaged or upright position using a biasing element. For example, the multimorph 110 of the actuated dot structure 110 may be used to bias the pin 104 as described herein. In other embodiments described herein the biasing element may be a spring or other suitable biasing element.

The method 1300 of FIG. 13 may include actuating 1306 a multimorph to latch the pin in an engaged position with the flexible diaphragm. Actuation of the multimorph 110 may be performed as described herein. The latching of the pin 104 may be performed by the latching elements 112, 114 or the supporting block 1114 in a suitable manner.

The following general description may apply to some or all of the disclosed embodiments in the present disclosure. There are many advantages for the electroactive polymer actuated dot structure 100, 1100 disclosed herein. Advantages of the electroactive polymer actuated dot structure technology, including PVDF multimorph technology, is generally described below. Four important aspects may include: high performance; low cost; portability; and reliability. The first aspect may be high performance. The actuated dot structure 100, 1100 can meet all the NLS requirements for making a Braille dot, Braille cell, and Braille display in terms of the actuation system, providing large displacement (0.5 mm) and supporting force (30 grams) for Braille dot, as well as very fast response time (less than 100 ms) simultaneously. As is discussed herein, the 0.5 mm displacement can be achieved by a biasing element (e.g., spring underneath a pin, or multimorph). The 30 grams or more of supporting force may be achieved by a latching mechanism. Because the response time of PVDF multimorph 110 may be less than 30 ms and there are no other mechanisms to impede response time the overall response time of the Braille dot may be less than 30 ms.

The second aspect may be low cost. The cost for making the actuated dot structure 100, 1100 can be lowered dramatically compared to conventional Braille cells. There are three reasons, one is that thousands of PVDF multimorphs can be fabricated on a sheet of PVDF thin film using photolithographic patterning of the electrodes. The second reason is processing cost. Conventional Braille cells constructed of PZT ceramic may need to use a diamond saw to cut the PZT ceramic into a two inch long ceramic multimorph, which may be very costly. Conventional PZT ceramic may also require etching after the cutting process to prevent arcing from Braille cell to Braille cell. In contrast, the PVDF thin film is relatively easy to cut into the multimorph desired dimensions disclosed herein using a sharp knife. Additionally, because of the use of photolithographic patterning of electrodes, a small space can be reserved on the boundary between the edge of the multimorph and the edge of the electrode for preventing arcing. Furthermore, the actuated dot structure disclosed may be fabricated using an integrated method. A column of actuated dot structures may be made at one time. The components including PVDF multimorphs, micro-molding of plastic cavities, electrical circuitry, assembling and packaging, etc. disclosed may be processed using a modern integrated microelectronic fabrication concept.

In accordance with embodiments, a multi-electrode multimorph may be constructed of PVDF multimorphs with non-electroded edges (to prevent arcing across its relatively small thickness) using a method for patterning electrodes onto plastic film using micro-fabrication techniques. Extension of this method allows the patterning of separate and distinct electrodes onto each surface (including an interlayer boundary). The PVDF thin film uses a unique structure. The PVDF thin film may contain small surface regions which are intentionally devoid of electrode metal or may include narrow wire traces for interconnection. Further, the separated or patterned electrodes can be used to subject different regions of the multimorph to different stress profiles with a resulting programmed strain profile, which may lead to transduction of simultaneous multiple curvatures of the PVDF multimorph.

A third advantageous aspect of the present disclosure is portability. Low power consumption may be advantageous for battery driven portable devices. The PVDF multimorph may be driven by a DC voltage with no current flow through the multimorph. Also, since the large supporting force for actuated dot structure may be provided by the latching mechanism, there may be no need for other actuator support to displace the pin between reading and resting positions. Thus, power consumption may be very low. Furthermore, the driving voltage may be lowered below 500 V with the actuated dot structure disclosed herein. In an embodiment using a supporting block or the multimorph the force required to push the supporting block may be very small, thus high voltage may not be needed to drive the multimorphs for latching and the DC bias may be less than 500 V. Additionally, any of the components in the Braille display may be made of plastic, thus the Braille display may be very light weight. Also, because PVDF polymer may have a large strain, the multimorph can provide large displacement with a relatively small dimension. In this manner, the Braille display may be very compact.

The fourth aspect may be reliability. The PVDF multimorph can be operated in a wide range of temperature and humidity conditions. Further, the PVDF multimorph can operate 1 million cycles without changing its tip displacement value. The actuated dot structure disclosed herein may reduce the tolerance for each part in the Braille cell system greatly, which enables the Braille display to operate in a many types of environmental conditions. Further, the actuated dot structure may be very durable since PVDF polymer is very resilient.

The pin may be made of plastic or any other suitable material. An actuator may be polymer or other suitable material. The term "polymer" may imply or be meant to include a molecular asymmetry from which actuation physics (reverse piezoelectric effect) can occur.

The present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the present disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the embodiments have been described in connection with the various embodiments of the various figures, it is to be understood that other similar embodiments may be used or modifications and additions may be made to the described embodiment for performing the same function without deviating therefrom. Therefore, the disclosed embodiments should not be limited to any single embodiment, but rather should be construed in breadth and scope in accordance with the appended claims.

Features from one embodiment or aspect may be combined with features from any other embodiment or aspect in any appropriate combination. For example, any individual or collective features of method aspects or embodiments may be applied to apparatus, system, product, or component aspects of embodiments and vice versa.

What is claimed:

1. An actuated dot structure comprising:
   a housing;
   a pin configured to move between a first position and a second position with respect to the housing; and
   a multimorph engaged with the pin and configured to displace the pin between the first and second positions and to latch the pin in the second position, wherein the multimorph has an active layer with a thickness between about 5 μm and about 200 μm.

2. The actuated dot structure of claim 1, wherein the multimorph is configured as a sensing element for sensing displacement of the pin.

3. The actuated dot structure of claim 1, wherein the pin defines a latching portion positioned to engage a latching portion of the multimorph, and
   wherein the latching portion of the multimorph and the latching portion of the pin are configured to latch together when the multimorph is actuated.

4. The actuated dot structure of claim 3, wherein the latching portion of the multimorph is attached to the pin and engages a supporting portion of the housing.

5. The actuated dot structure of claim 1, wherein the multimorph is made of polymer.

6. The actuated dot structure of claim 1, wherein the multimorph is made of piezoelectric polyvinylidene fluoride or piezoelectric polyvinylidene difluoride (PVDF).

7. The actuated dot structure of claim 1, wherein the multimorph is made of a polymer that can generate bending action of the multimorph.

8. An actuated dot structure comprising:
   a housing;
   a pin configured to move between a first position and a second position with respect to the housing; and
   a multimorph engaged with the pin and configured to displace the pin between the first and second positions and to latch the pin in the second position,
   wherein the multimorph comprises:
   an active portion of a first width and comprises;
      a plurality of electrodes; and
      a plurality of layers; and
   a flexible, passive portion of a second width.

9. The actuated dot structure of claim 8, wherein the flexible, passive section consists of a single layer.

10. The actuated dot structure of claim 8, wherein the active section of the multimorph defines a latching portion.

11. An actuated dot structure comprising:
    a housing;

a pin defining a latch opening, including a first end and a second end, and configured to move between a first position and a second position with respect to the housing;

a multimorph including a supporting portion configured to controllably engage and disengage the latch opening;

a biasing element configured to engage the second end of the pin for biasing the pin to move towards the second position; and a controller configured to actuate the multimorph to move between a third position with the supporting portion within the latch opening for holding the pin in the first position, and a fourth position in which the supporting portion is outside of the latch opening of the pin.

12. The actuated dot structure of claim 11, wherein the biasing element comprises a spring, and wherein the spring is configured to bias the pin with a supporting force of between about 0.1 gram and 1 gram.

13. The actuated dot structure of claim 12, wherein the biasing element is a cantilever spring made of polymer films.

14. The actuated dot structure of claim 13, wherein the polymer films are plastic films.

15. The actuated dot structure of claim 14, wherein the plastic films comprise one of PVDF, polyethylene, PVC, and nylon having a Young's modulus less than 5 gigapascals (GPa).

16. The actuated dot structure of claim 15, wherein the plastic film has a thickness between 30 µm and 100 µm.

17. The actuated dot structure of claim 13, wherein the cantilever is made of piezoelectric polyvinylidene difluoride (PVDF) thin film.

18. The actuated dot structure of claim 17, wherein the cantilever is configured as one of a cantilever spring and a sensor.

19. The actuated dot structure of claim 11, wherein the pin is configured with a travel displacement of between about 0.5 mm and 1 mm between the first and second positions.

20. The actuated dot structure of claim 19, wherein the length of the multimorph is between about 5 mm and about 50 mm, and the length of the housing is between about 5 mm and about 50 mm.

21. The actuated dot structure of claim 11, wherein the biasing element comprises a rubber spring that is resilient.

22. The actuated dot structure of claim 21, wherein the rubber spring is made of one of polyurethane, silicone, and room temperature vulcanized (RTV) silicone having a Young's modulus less than 50 megapascals (MPa).

23. The actuated dot structure of claim 21, wherein the rubber spring has a thickness between 0.1 and 1 millimeters.

24. The actuated dot structure of claim 11, wherein the biasing element is a coil spring made of stainless steel wire.

25. The actuated dot structure of claim 24, wherein the diameter of the stainless steel wire is less than 0.2 millimeters.

26. The actuated dot structure of claim 24, wherein the outer diameter of the coil spring is less than 2.5 millimeters.

27. The actuated dot structure of claim 11, wherein the biasing element is configured to use a magnetic effect.

28. An actuated dot structure comprising:

a housing;

a pin defining a latch opening, including a first end and a second end, and configured to move between a first position and a second position with respect to the housing;

a multimorph including a supporting portion configured to controllably engage and disengage the latch opening; and a biasing element configured to engage the second end of the pin for biasing the pin to move towards the second position, wherein the multimorph is made of piezoelectric polymer.

29. An actuated dot structure comprising:

a housing;

a pin defining a latch opening, including a first end and a second end, and configured to move between a first position and a second position with respect to the housing;

a multimorph including a supporting portion configured to controllably engage and disengage the latch opening; and a biasing element configured to engage the second end of the pin for biasing the pin to move towards the second position, wherein the multimorph is made of piezoelectric polyvinylidene fluoride or piezoelectric polyvinylidene difluoride (PVDF).

30. A method of actuating an actuated dot structure, the method comprising:

providing an actuated dot structure comprising:

a housing;

a pin including a top end, and configured to move between a first position and a second position with respect to the housing; and a multimorph engaged with the pin, configured to displace the pin between the first and second positions, and configured to latch the pin in the second position;

biasing the pin to move towards the second position; and actuating a multimorph to latch the pin in the second position.

31. The method of claim 30, wherein the multimorph is the biasing element.

32. The method of claim 30, further comprising sensing a displacement of the pin using the multimorph.

* * * * *